United States Patent [19]
Lee

[11] Patent Number: 6,055,355
[45] Date of Patent: Apr. 25, 2000

[54] METHOD FOR CONTROLLING PICK-UP UPON VIDEO-DISK SEARCH

[75] Inventor: Ho-Chul Lee, Suwon, Rep. of Korea

[73] Assignee: Samsung Electronics Co., Ltd., Rep. of Korea

[21] Appl. No.: 08/951,699

[22] Filed: Oct. 16, 1997

[30] Foreign Application Priority Data

Oct. 17, 1996 [KR] Rep. of Korea ...................... 96-46557

[51] Int. Cl.[7] .................................................. H04N 5/91
[52] U.S. Cl. ......................... 386/70; 360/72.1; 369/44.28
[58] Field of Search ................... 386/45, 69–70; 369/32, 44.28; 360/78.04, 72.1, 72.2, 72.3; H04N 5/91

[56] References Cited

U.S. PATENT DOCUMENTS

| | | | |
|---|---|---|---|
| 4,236,232 | 11/1980 | Jansen et al. | 369/44.28 |
| 4,482,925 | 11/1984 | Sugiyama et al. | 386/70 |
| 4,555,736 | 11/1985 | Mathieu et al. | 369/32 |
| 4,799,205 | 1/1989 | Maeda | 369/32 |
| 4,814,897 | 3/1989 | Kojima et al. | 386/70 |
| 4,849,828 | 7/1989 | Yasuda et al. | 386/70 |
| 5,218,450 | 6/1993 | Nagai et al. | 369/44.28 |
| 5,398,222 | 3/1995 | Kim | 369/44.28 |
| 5,497,243 | 3/1996 | Sakata et al. | 360/72.2 |
| 5,513,155 | 4/1996 | Kim et al. | 369/44.28 |

*Primary Examiner*—Wendy Garber
*Assistant Examiner*—Vincent F. Boccio
*Attorney, Agent, or Firm*—Dilworth & Barrese

[57] ABSTRACT

The present invention discloses a method for controlling an optical pick-up which enables the exact reproduction of a screen image at a user's desired location during a video-disk search. The control method stores the time when a search-off command, (i.e., a reproducing command signal) is input and the time when the pick-up is actually stopped, and then moves the pick-up toward the identified time location when the reproducing command signal was input to reproduce the disk. The control method prevents the reproduction of a track image at a location slightly beyond from a desired image caused by the inertia of a pick-up.

8 Claims, 3 Drawing Sheets

METHOD FOR CONTROLLING PICK-UP UPON VIDEO-DISK SEARCH

BACKGROUND OF THE INVENTION

1. Field of the Invention

The present invention relates to an optical disk pick-up control, and more particularly to a method for controlling an optical disk pick-up at the time of an optical disk search, to prevent the display of a track image at a location slightly beyond a desired image due to the inertia of a pick-up when a search-off (reproduction command) key signal is input at the desired image portion during a video-disk search.

2. Description of the Related Art

FIG. 1 is a diagram for illustrating the movement state of an optical pick-up device at the time of a search operation which includes an optical disk 3, a spindle motor 1, and an optical pick-up 5.

In other embodiments, the spindle motor 1 includes a spindle and a turntable, which rotates the optical disk by means of a rotating servo. In this embodiment, the optical pick-up 5 is moved along the tracks of the video-disk by means of a tracking servo and a focusing servo.

FIG. 2 is a flowchart showing a pick-up control method at the time of a conventional video-disk search, which will be explained below with reference to FIG. 1.

When a user wants to search a specific image on an optical disk, he and/or she has to input a key signal initiating a search with an external input means (S1).

When a search-on key signal is input from the external input means, the optical pick-up 5 searches given images beginning at a first track location P0 while moving the optical pick-up 5 along the tracks of the video-disk (S2).

During searching of the given images, if the user inputs a search-off key signal, (i.e., a reproducing signal) so as to watch a specific screen image (S3), due to the inertia of the pick-up, optical pick-up 5 displays on a screen an image at a track location P1+ΔP slightly over the track location P1 at the time when a search-off key signal was input (S4).

Therefore, if a search-off key signal is inputted at the time of a conventional video-disk search, there is a deficiency in that the user's desired image portion can not be exactly searched and reproduced because a pick-up is stopped at a location slightly beyond a desired screen location due to the inertia of the pick-up.

SUMMARY OF THE INVENTION

Therefore, in order to solve the above mentioned problem, it is an object of the present invention to provide a method for controlling an optical pick-up at the time of a video-disk search. The disclosed method prevents a track image at a location slightly beyond the desired image from being picked up when a search-off (i.e., reproducing command) key signal is inputted at a specific image portion during the video-disk search.

To accomplish the above purpose, the method according to the present invention is characterized in that it comprises the steps of: checking whether a command for initiating a search operation is inputted from an external input means; searching an image of a track when the command for initiating a search is inputted; checking whether a command for initiating a search-off is inputted by a user while searching the image of the track; stopping the pick-up at a given track location when the command for initiating a search-off is inputted; storing a time when the search-off command is inputted and the time when the pick-up is actually stopped; comparing the time when the search-off signal is inputted and the time when the pick-up is actually stopped and then determining a difference between them, if any; adjusting the pick-up into a track location at the time when the search-off key signal is inputted, when the time of the input search-off key signal and the time when the pick-up is actually stopped are different from each other; and displaying images of the adjusted track location.

BRIEF DESCRIPTION OF THE DRAWINGS

The above object, and other features and advantages of the present invention will become more apparent by describing preferred embodiments thereof with reference to the accompanying drawings, in which.

DETAILED DESCRIPTION OF PREFERRED EMBODIMENTS

Hereinbelow, a preferred embodiment of the present invention will be described in detail with reference to the accompanying drawings.

Figure 1:
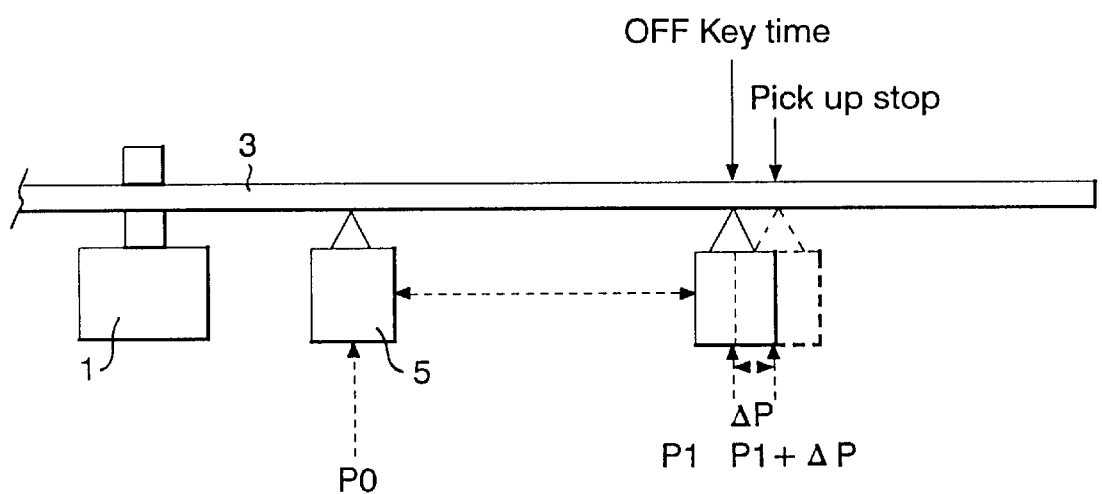
FIG. 1 is a diagram for illustrating a movement state of pick-up at the time of a search operation in a general optical pick-up device.
Figure 2:
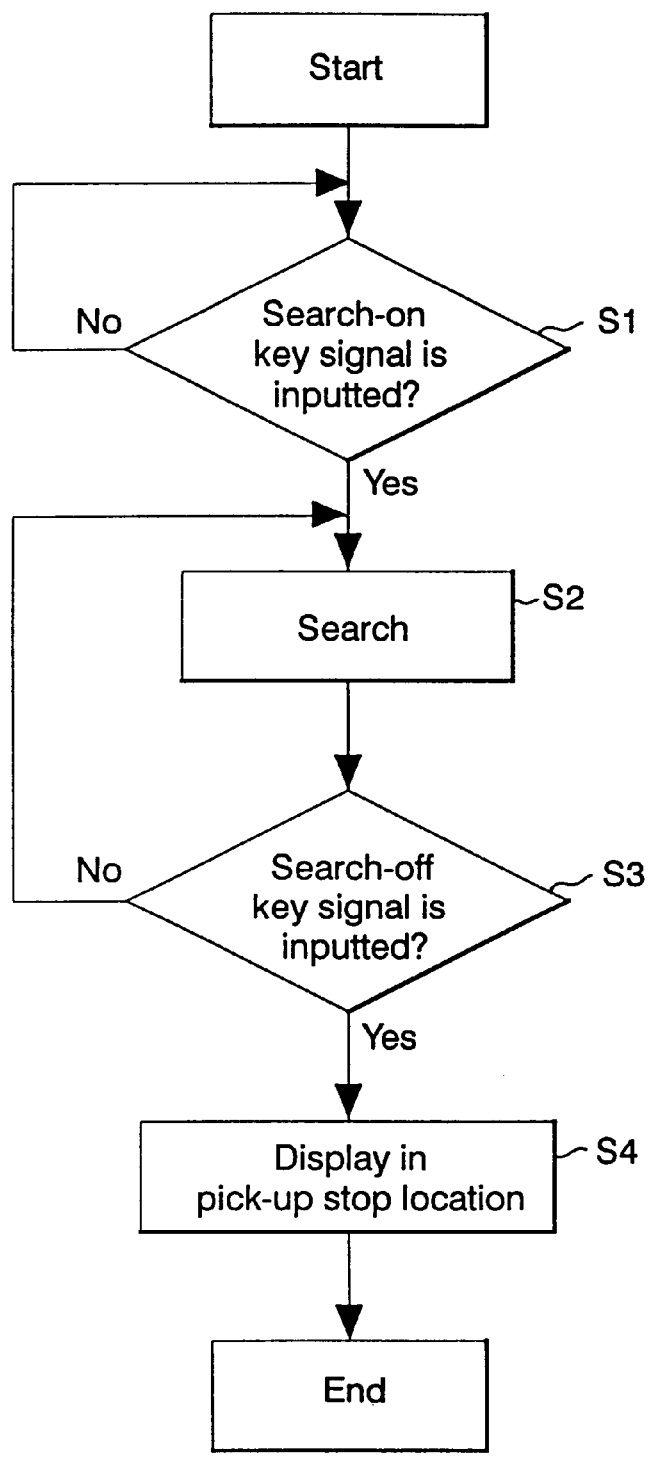
FIG. 2 is a flowchart illustrating an optical pick-up control method during a conventional video-disk search.
Figure 3:
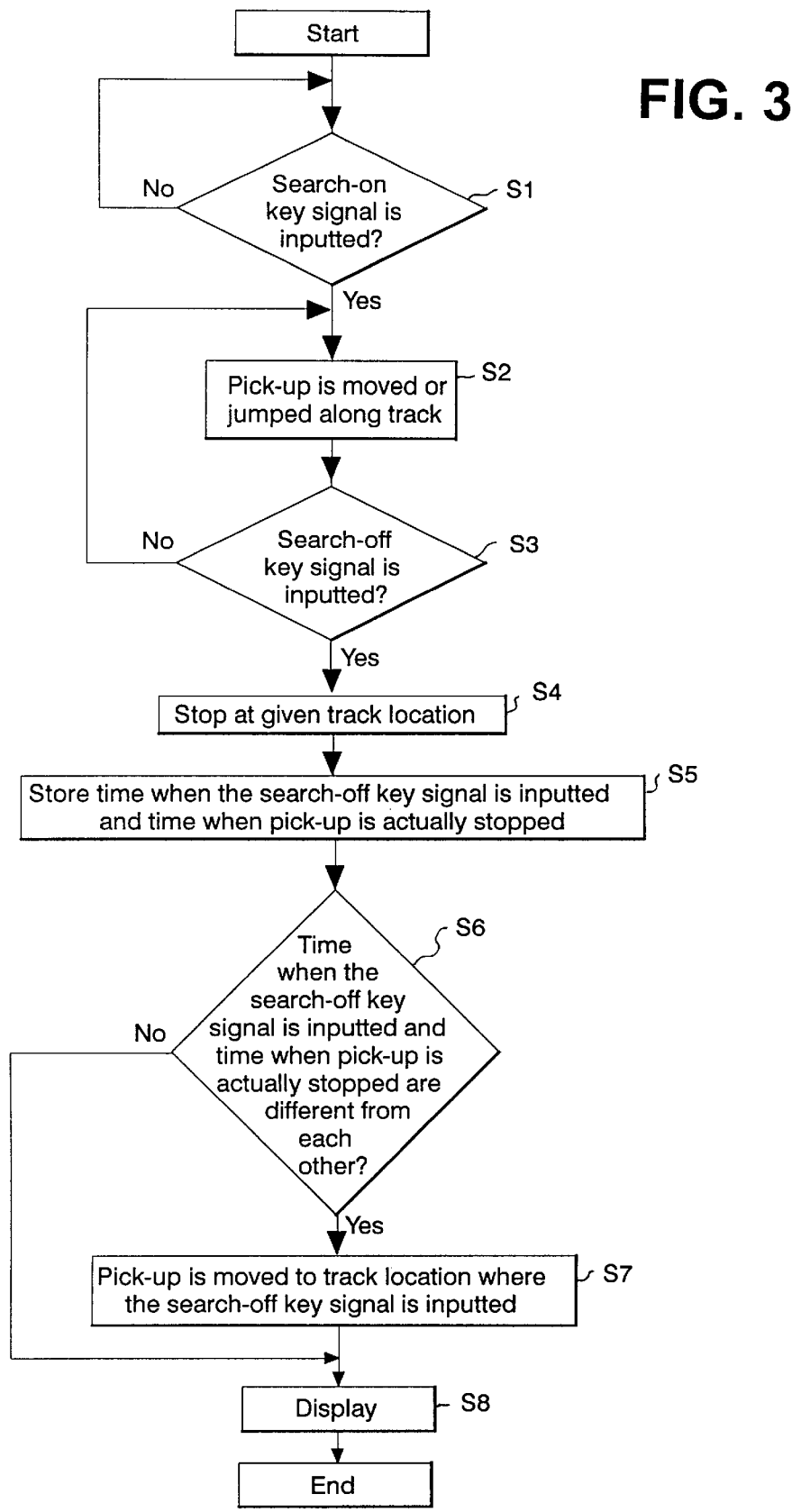
FIG. 3 is a flowchart illustrating the optical pick-up control procedures at the time of a video-disk search according to the present invention.

FIG. 3 is a flowchart illustrating the optical pick-up control procedures at the time of a video-disk search according to the present invention, which will be explained below by reference to FIG. 1.

First, if a user wants to search a specific image on a video-disk, he and/or she has to input a key signal initiating an image search by means of an external input means (S1).

If the search-on key signal is inputted from the external input means, the optical pick-up 5 searches given images beginning at a first track location P0 while moving along the tracks of the video-disk or jumping them therebetween, and displays those images on the screen (S2).

During the search of the given images, if the user inputs a search-off key signal reproducing a specific screen image, (i.e., a reproducing signal), the pick-up 5 stops at a given track location P1+ΔP (S4). At this time, it counts the time when the search-off key signal (e.g., search stop command) was input and the time when the pick-up is actually stopped at the given track and then stores these time values. Due to the inertia of pick-up 5, the pick-up does not stop at the location when the search-off key signal actually input, but moves a little beyond the desired location by a small distance ΔP.

After storing the time when the search-off key signal is input and the time when the pick-up 5 is actually stopped, a determination is made whether the two stored times are different from each other (S6). If the two times are different, the track location is controlled where, pick-up 5 is moved from the track location P1+ΔP at the final pick-up location toward the track location P1 where the search-off key signal was input (S7). The storing of time data can be in any suitably known memory device, such as, for example a RAM.

Then, the pick-up reproduces or displays a video-disk image beginning at the track location which is controlled in the above control process (S8).

As in the above, if a user inputs a search-off key signal at the time of a video-disk search, since the pick-up is moved a little by a given distance from the track location P1 due to inertia of the pick-up 5 and then stopped P1+ΔP, a user's desired image can be exactly searched and reproduced by adjusting the pick-up position back to the track location P1 when the key signal was input.

The present invention may be also applicable to all kinds of disk or tape mediums using a pick-up or magnetic type read head as well as an optical video-disk. In addition, it makes it possible to exactly reproduce data at a desired location if the tape or disk is moved in a reverse direction by counting the travelling distance or time of a magnetic tape at the time of a received stop command.

Accordingly, as mentioned above, the present invention has an outstanding effect that can exactly search a user desired image at the time of a video-disk search.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A method of controlling a pick-up during a video-disk search, comprising the steps of:

searching for an image recorded in a track when a command for initiating a search is received;

stopping the pick-up at a given track location when a command for initiating a search-off is received;

comparing the time when the search-off signal was received and the time when the pick-up is actually stopped;

adjusting the pick-up into a track location at the time when the search-off signal was received, when the compared times are different; and displaying images of the adjusted track location.

2. The method according to claim 1, further comprising the steps of:

determining whether the command for initiating the search operation is input from an external input means; and determining whether the command for initiating the search-off is input by a user while searching the image of a track.

3. The method according to claim 1, further comprising the step of:

storing the times when the search-off command is received and when the pick-up actually stops.

4. The method according to claim 1, wherein said step of comprising further comprises the step of determining a difference between the two compared times.

5. A method for controlling a read head during a video search comprising the steps of:

searching for an image when a search command is received;

stopping the read head in response to an input search stop command;

comparing a time when the search stop command was input and the time when the read head actually stopped in response to the stop command;

adjusting the read head into an image position corresponding to the time of the input search stop command; and displaying the image of the adjusted track position.

6. The method according to claim 5, further comprising the steps of:

storing the compared times in a memory device; and determining the difference between the compared times.

7. The method according to claim 6, wherein said step of adjusting is performed when a difference between the two compared times exists.

8. The method according to claim 5, further comprising the steps of:

determining whether the command for initiating the search operation is input from an external input device; and determining whether the search stop command is input by a user while searching for video image.

* * * * *